J. J. WOOD.
DYNAMO ELECTRIC MACHINE.
APPLICATION FILED APR. 26, 1913.

1,102,116.

Patented June 30, 1914.

Witnesses:
George H. Tilden
J. Ellis Glen

Inventor:
James J. Wood,
by Albert G. Davis
His Attorney.

UNITED STATES PATENT OFFICE.

JAMES J. WOOD, OF FORT WAYNE, INDIANA, ASSIGNOR TO GENERAL ELECTRIC COMPANY, A CORPORATION OF NEW YORK.

DYNAMO-ELECTRIC MACHINE.

1,102,116.  Specification of Letters Patent.  Patented June 30, 1914.

Application filed April 26, 1913. Serial No. 763,776.

*To all whom it may concern:*

Be it known that I, JAMES J. WOOD, a citizen of the United States, residing at Fort Wayne, in the county of Allen, State of Indiana, have invented certain new and useful Improvements in Dynamo-Electric Machines, of which the following is a specification.

My invention relates to dynamo electric machines and more particularly to synchronous motors.

It has for its object a novel combination and construction of parts whereby a synchronous motor may be readily started under load and may be kept in synchronism although the voltage of the source of supply varies between wide limits. To this end, I couple the synchronous motor with an electric motor through a resilient means.

Other features of novelty which characterize my invention are pointed out with particularity in the claims annexed to and forming a part of this specification.

For a better understanding of my invention, reference may be had to the following description taken in connection with the accompanying drawing, in which—

Figure 1:
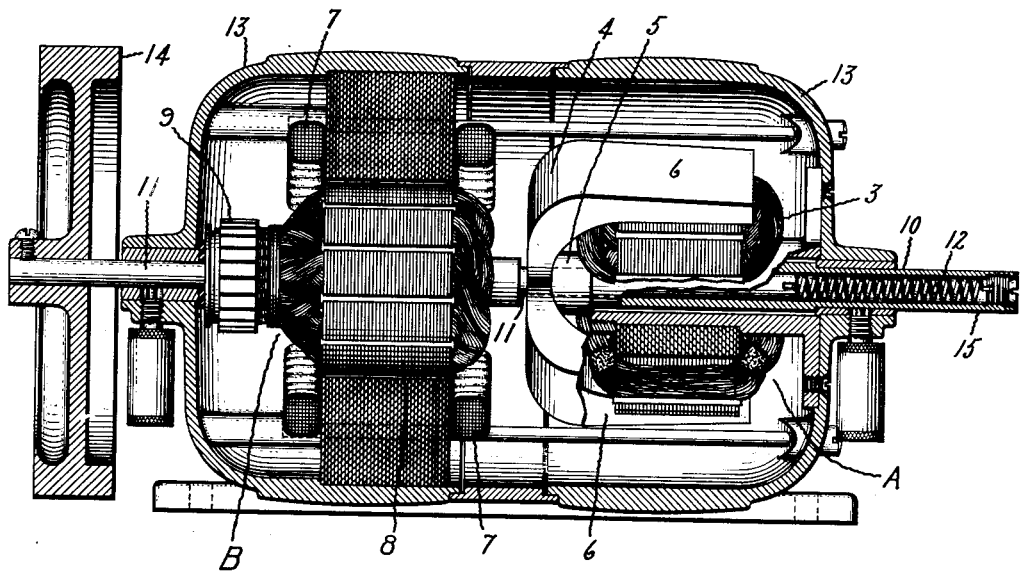
Figure 2:
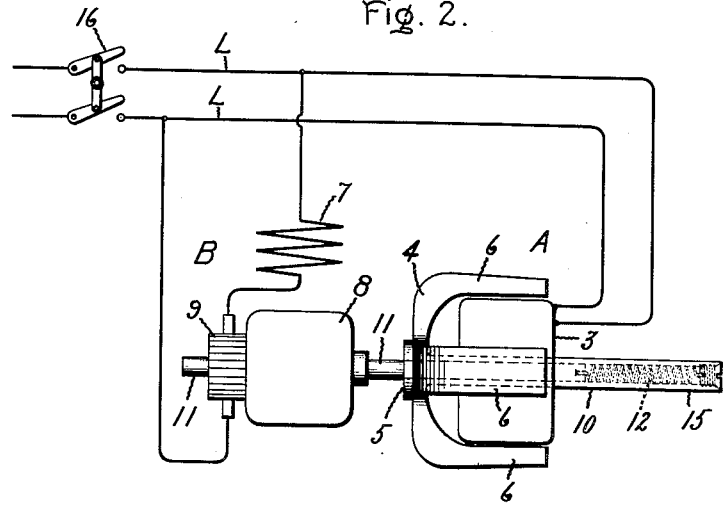

Figure 1 is a view, partly in section, of a synchronous motor arranged in accordance with my invention, and Fig. 2 is a diagrammatic view of the connections of the machines of Fig. 1.

In the drawing, A is a synchronous motor resiliently connected to an electric motor B by means of a spring. The motor B is preferably of the non-synchronous type. I have shown the synchronous motor A as having a stationary member 3 surrounded by a revolving member 4 formed of a piece of steel. The member 3 is wound so as to produce an alternating magnetic field when supplied with alternating current. The member 4 comprises a hub 5 from which project poles 6. The motor B is shown as having a stationary member or field 7 and a revolving member or armature 8 provided with a commutator 9. These parts may be of any usual or well known constructions.

One of the revolving members of machine A or B is mounted on a hollow shaft and the other of said revolving members is mounted on a shaft on which the hollow shaft is mounted, the two shafts being connected together resiliently. Preferably, the hub 5 of the member 4 of the synchronous motor A is mounted on a hollow shaft 10 which in turn is mounted on a shaft 11 on which the armature 8 is mounted. The shafts 10 and 11 are connected together by a spring 12. The shafts 10 and 11 are journaled in a frame 13 which incloses the machines A and B. A fly wheel 14 is shown as being mounted on the shaft 11. The load is connected to the end 15 of shaft 10, as by means of a pulley.

In the diagram of Fig. 2, the field 7 and armature 8 of motor B are shown as connected in series across the mains L, L to which the member 3 of machine A is also connected. A switch 16 is provided for connecting the mains L, L to a source of alternating current. It is well known that if it is attempted to operate the machine A as a motor, it will not start from standstill. With the arrangement shown in the drawings, however, the machine A may be started up by simply closing the single switch 16. Upon starting, the machines A and B will attain synchronous speed in a few seconds, that is, the series motor B has enough torque to bring the member 4 of motor A up to or a little beyond synchronous speed under full load. At the same time, alternating current is flowing through the stationary member 3 of machine B, and produces an alternating field which will attract the poles of the star-shaped member 4 and hold it in synchronism. As the series motor tends to run above synchronous speed, and machine A tends to run at synchronous speed, the spring 12 connecting these machines will be compressed. If, for any reason, the voltage of the source should be reduced the speed of the series motor will be reduced. This will tend to unwind the spring and force the member 4 to advance slightly so as to make up for the slowing down of the series motor, the member 4, however, maintaining its synchronous speed. If, on the other hand, the voltage should rise and the armature of the series motor speed up beyond synchronism, the poles which are being generated in the stationary member 3 would become stronger and the spring 12 would be compressed more than normally, the member 4 still remaining in synchronism.

I desire it to be understood that my invention is not limited to the particular construction and arrangement of parts shown and described, and I aim in the appended claims to cover all modifications which do not depart from the spirit and scope of my invention.

What I claim as new and desire to secure by Letters Patent of the United States, is:

1. In combination, a source of alternating current, a synchronous motor connected to said course, a non-synchronous motor connected to said source, and resilient means connecting the revolving members of said motors.

2. In combination, a source of alternating current, a synchronous motor having one of its members connected to said source, a non-synchronous motor having its members connected in series to said source, and resilient means connecting the revolving members of said motors.

3. In combination, a synchronous motor having stationary and revolving members, a non-synchronous motor having stationary and revolving members, one of said revolving members being mounted on a hollow shaft and the other of said revolving members being mounted on a shaft on which said hollow shaft is mounted, and resilient means connecting said shafts.

4. In combination, a synchronous motor having stationary and revolving members, a non-synchronous motor having stationary and revolving members, the revolving member of said synchronous motor being mounted on a hollow shaft, a shaft on which the revolving member of said non-synchronous motor is mounted, said hollow shaft being mounted on said other shaft, and resilient means connecting said shafts.

5. In combination, a source of alternating current, a synchronous motor having a stationary member and a revolving member, said stationary member being connected to said source, a non-synchronous alternating current motor having a revolving member and a stationary member connected in series to said source, and resilient means connecting said revolving members.

6. In combination, a source of alternating current, a synchronous motor having a stationary member and a revolving member, said stationary member being connected to said source, said revolving member being mounted on a hollow shaft, a non-synchronous alternating current motor having a revolving member and a stationary member connected in series to said source, a shaft on which said revolving member of said non-synchronous motor is mounted, said hollow shaft being mounted on said other shaft, and resilient means connecting said shafts.

In witness whereof, I have hereunto set my hand this 23rd day of April, 1913.

JAMES J. WOOD.

Witnesses:
J. J. KING,
H. F. EBERHART.